(12) United States Patent
Balka et al.

(10) Patent No.: US 11,969,927 B2
(45) Date of Patent: Apr. 30, 2024

(54) INJECTION ARRANGEMENT FOR A MOULDING MACHINE AND METHOD FOR OPERATING THE SAME

(71) Applicant: ENGEL AUSTRIA GmbH, Schwertberg (AT)

(72) Inventors: Christoph Balka, Schwertberg (AT); Friedrich Pernkopf, Gramastetten (AT)

(73) Assignee: ENGEL AUSTRIA GMBH, Schwertberg (AT)

( * ) Notice: Subject to any disclaimer, the term of this patent is extended or adjusted under 35 U.S.C. 154(b) by 135 days.

(21) Appl. No.: 17/369,454

(22) Filed: Jul. 7, 2021

(65) Prior Publication Data
US 2022/0009140 A1 Jan. 13, 2022

(30) Foreign Application Priority Data

Jul. 8, 2020 (AT) .............................. A 50585/2020

(51) Int. Cl.
*B29C 45/58* (2006.01)
*B29C 45/03* (2006.01)
*B29C 45/47* (2006.01)

(52) U.S. Cl.
CPC .............. *B29C 45/58* (2013.01); *B29C 45/03* (2013.01); *B29C 45/47* (2013.01)

(58) Field of Classification Search
CPC .......... B29C 45/58; B29C 45/03; B29C 45/47
See application file for complete search history.

(56) References Cited

U.S. PATENT DOCUMENTS

| 4,234,216 | A | 11/1980 | Swanson et al. |
| 4,792,424 | A * | 12/1988 | Loman .................... B29C 45/48 |
| | | | 264/102 |
| 5,522,720 | A | 6/1996 | Schad |
| 5,540,580 | A | 7/1996 | Takada |
| 6,461,140 | B1 * | 10/2002 | Bosg .................... B29C 45/2701 |
| | | | 425/585 |
| 7,232,538 | B2 | 6/2007 | Mai |

(Continued)

FOREIGN PATENT DOCUMENTS

| AT | 521056 | 10/2019 |
| DE | 1 847 590 | 3/1962 |

(Continued)

OTHER PUBLICATIONS

Machine Translation JPS61121912A (Year: 1986).*

*Primary Examiner* — Jacob T Minskey
*Assistant Examiner* — Wayne K. Swier
(74) *Attorney, Agent, or Firm* — Wenderoth, Lind & Ponack, L.L.P.

(57) ABSTRACT

An injection arrangement for a moulding machine includes a moulding compound reservoir and an injection unit. The moulding compound reservoir is configured to provide a plasticized mass and to push out the plasticized mass through a discharge opening, and a connecting device is coupled to the discharge opening of the moulding compound reservoir and a feed opening of the injection unit, and is configured to direct the plasticized mass from the moulding compound reservoir to the injection unit. The connecting device includes an articulated element, and a relative movement between the moulding compound reservoir and the injection unit can be performed with the articulated element.

20 Claims, 6 Drawing Sheets

(56) References Cited

U.S. PATENT DOCUMENTS

| | | | |
|---|---|---|---|
| 2003/0057606 A1* | 3/2003 | Brix | B29C 45/1808 |
| | | | 425/130 |
| 2006/0083808 A1 | 4/2006 | Mai | |
| 2016/0207241 A1* | 7/2016 | Gerigk | B29C 45/46 |

FOREIGN PATENT DOCUMENTS

| | | | |
|---|---|---|---|
| DE | 29 00 354 | 7/1979 | |
| DE | 89 13 972 | 3/1991 | |
| DE | 92 15 192 | 1/1993 | |
| DE | 698 05 629 | 12/2002 | |
| DE | 10 2004 063 391 | 3/2006 | |
| DE | 10 2012 025 138 | 6/2014 | |
| EP | 0 709 174 | 5/1996 | |
| EP | 1 340 607 | 5/2005 | |
| EP | 1 802 433 B1 | 3/2010 | |
| JP | 61121912 A * | 6/1986 | B29C 45/12 |
| JP | 2010-17980 | 1/2010 | |
| WO | 2018/164665 | 9/2018 | |

* cited by examiner

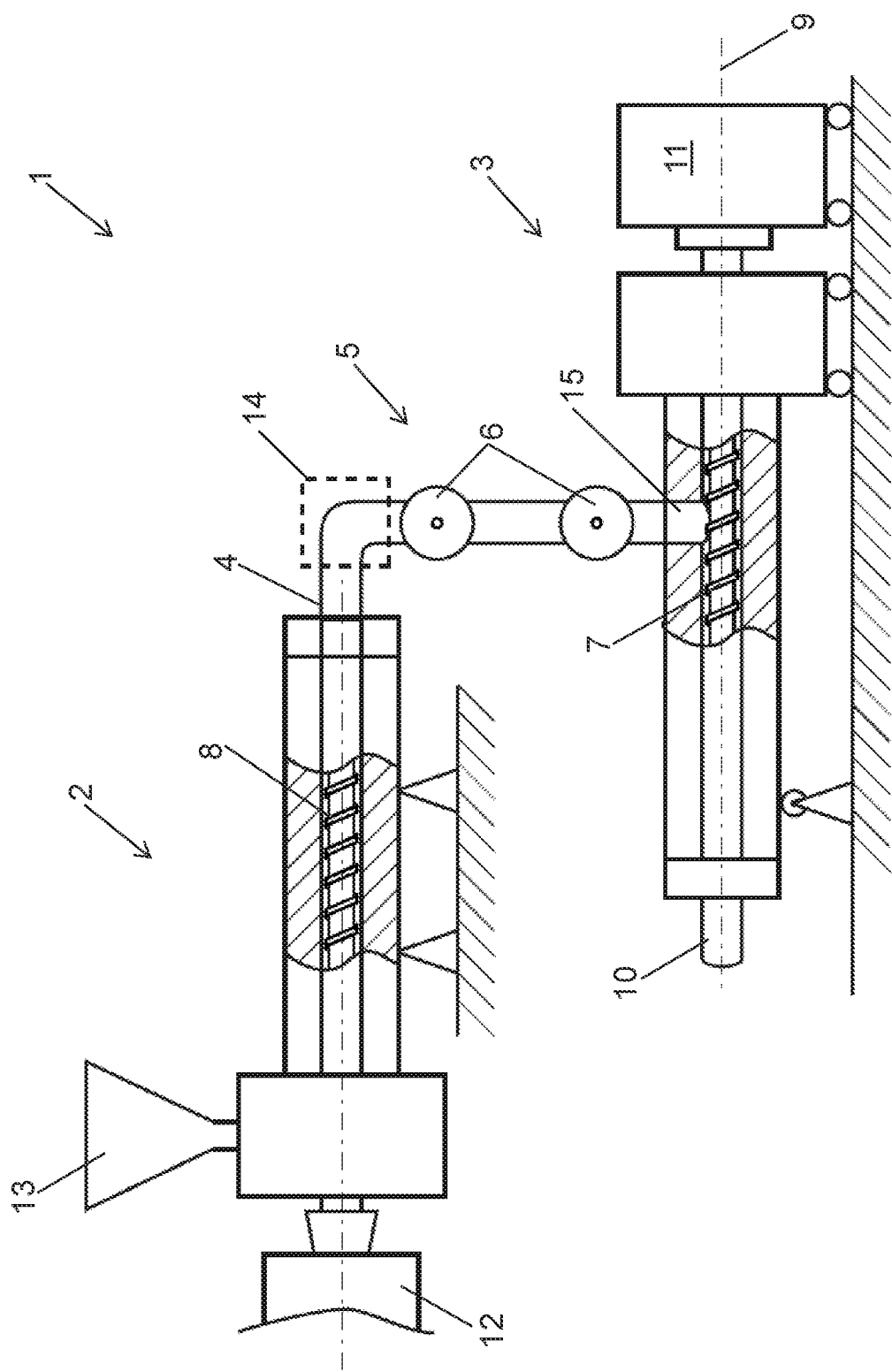

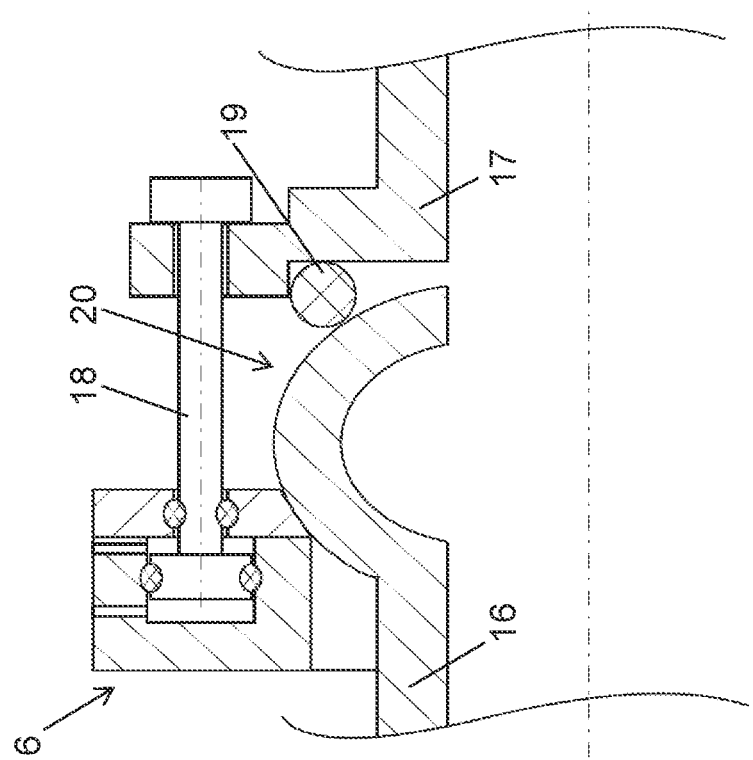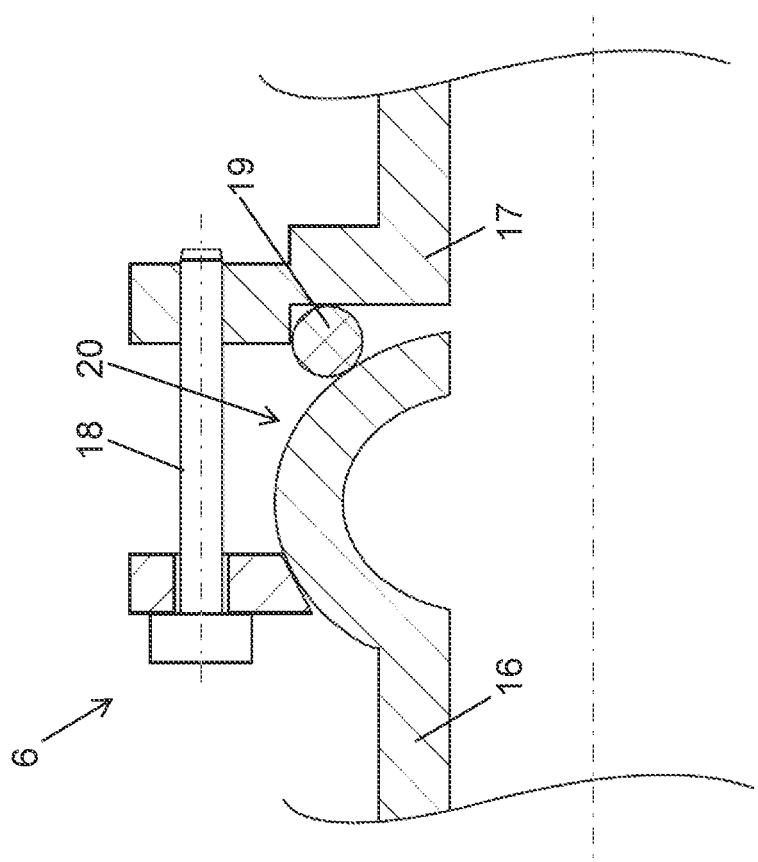

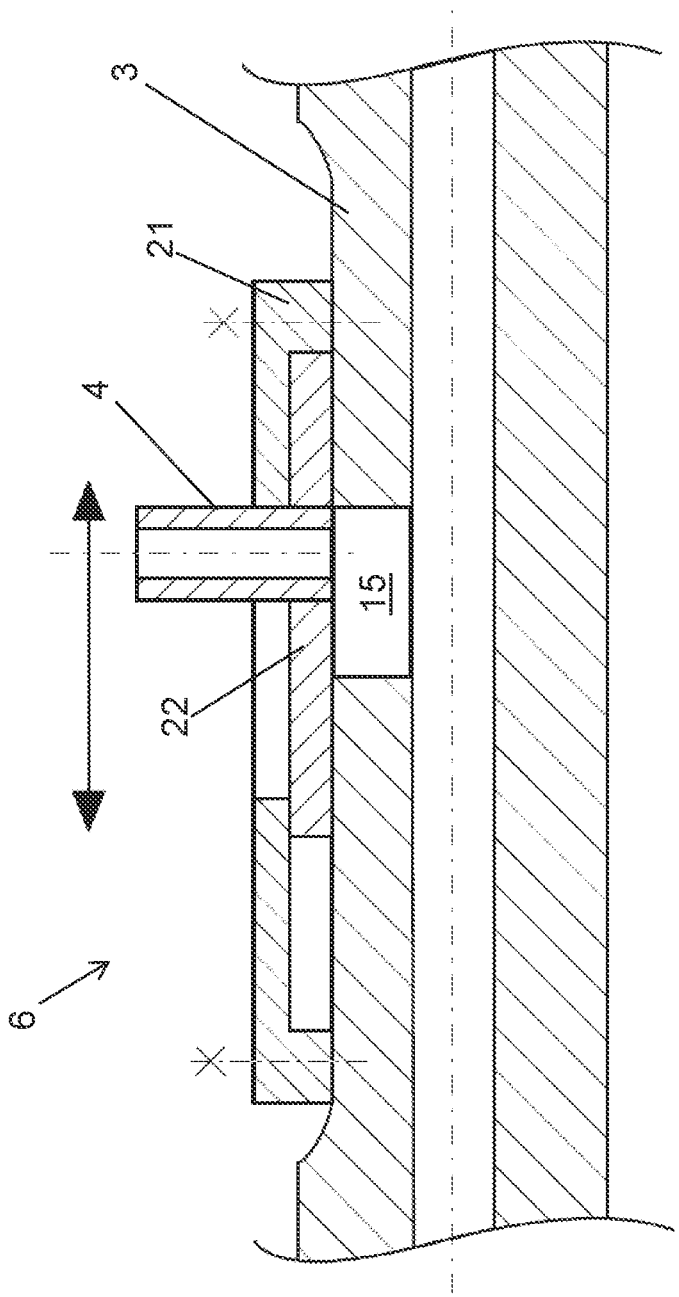

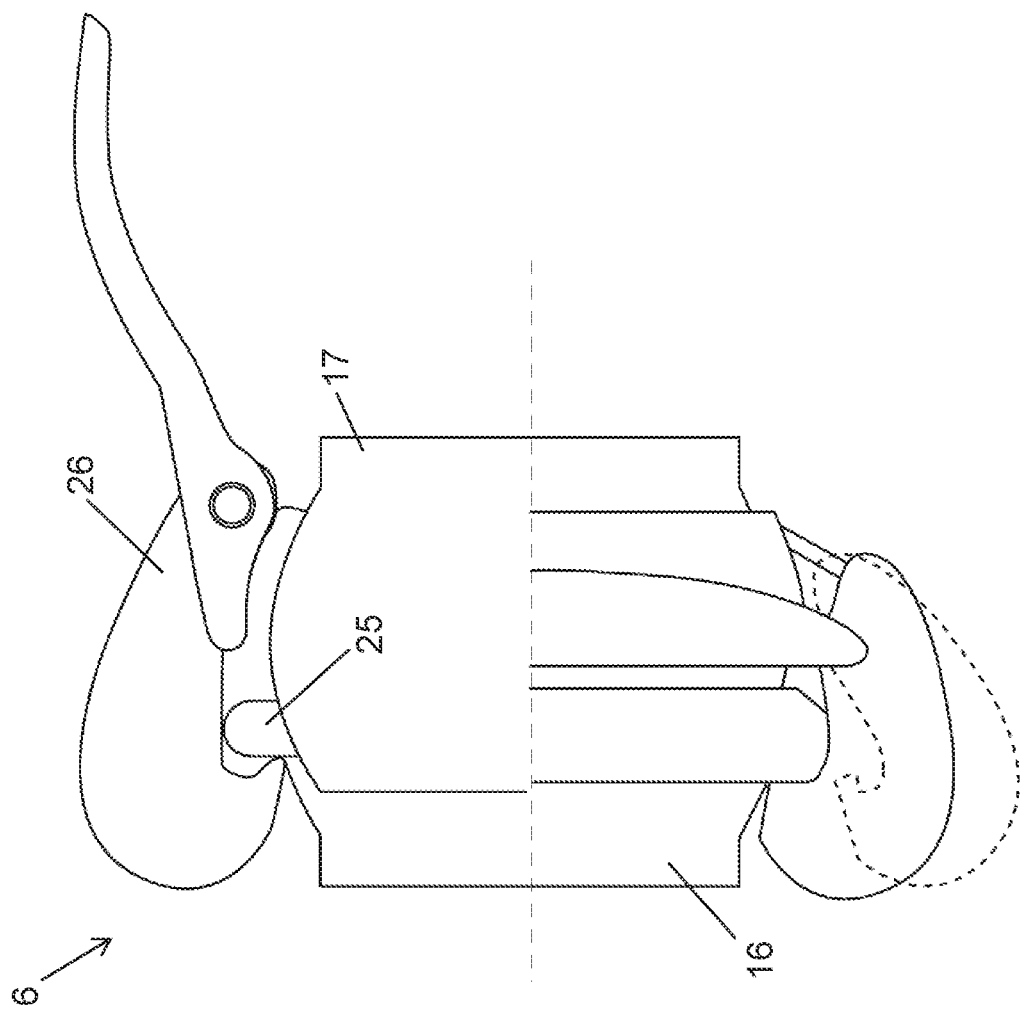

INJECTION ARRANGEMENT FOR A MOULDING MACHINE AND METHOD FOR OPERATING THE SAME

BACKGROUND OF THE INVENTION

The present invention relates to an injection arrangement for a moulding machine, a moulding machine with such an injection arrangement as well as a method for operating an injection arrangement for a moulding machine.

Generic injection arrangements have a moulding compound reservoir and an injection unit, wherein the moulding compound reservoir is configured to provide a plasticized mass and to push out the plasticized mass through a discharge opening. Via a connecting device, which is coupled to the discharge device of the moulding compound reservoir and an injection unit, the plasticized mass can be directed from the moulding compound reservoir to the injection unit.

In that, moulding machines can mean injection moulding machines, injection presses, presses, and the like. Moulding machines, in which the plasticized mass is fed to an open moulding tool, are quite conceivable, too. Hereinafter, the state of the art is to be briefly outlined based on an injection moulding machine. The same applies to moulding machines in general.

From the state of the art, injection moulding methods are known, in which a plasticized mass is fed to an injection unit via at least one moulding compound reservoir, from which injection unit the plasticized mass is subsequently passed on into or to a moulding tool.

In that, for example, the moulding compound reservoir can be configured as an extruder for plasticizing a thermoplastic material, wherein the plasticized plastic is subsequently passed on to an injection unit, which, for example, can be formed by an injection cylinder or an injection screw.

In this injection unit, the plasticized mass (more precisely: the plasticized plastic) is plasticized further, blended with a further material, or other further processing is undertaken.

Subsequently, the plasticized plastic is, most of the time, fed to a moulding tool via an axial movement of the injection unit. More precisely: in the case of an injection moulding machine, it is injected into a mould cavity of a moulding tool.

These processes are known, for example, from the state of the art as two-component injection moulding methods, in which at least two different plastics are used for a component to be produced, wherein the plastics monosandwich injection moulding method represents a special case of this two-component injection moulding technology. Such methods are, for example, known from EP 1 340 607 B1 or AT 521 056 B1.

A further application for respective injection arrangements for injection moulding machines is known from recycling applications, wherein firstly, by means of a plasticizing unit, a recycled material, as for example a recycled plastic, is plasticized and treated. Such treatments are, for example, the degassing of the plasticized mass or the addition of additives. Following this treatment, the plasticized mass is fed to the injection unit.

It is, however, a disadvantage of the known embodiments of the state of the art that due to the connection of the moulding compound reservoir with the injection unit, a very high installation space must be provided—above all, since the injection unit normally has to perform an axial movement.

Due to the connection of the injection unit with the moulding compound reservoir, the moulding compound reservoir must be carried along in the axial movement of the injection unit.

Such axial movements are, for example, the approaching or the pressing of the injection unit to a moulding tool.

This connection and the required installation space for moving the injection unit and the moulding compound reservoir not only results in increased installation space requirements, but also in increased energy demands, since the high mass moved requires an increased demand on the drive units for acceleration and deceleration.

SUMMARY OF THE INVENTION

The object of the invention is to provide an injection arrangement as well as a method for operating an injection arrangement, with which the installation space requirement can be reduced and/or the energy efficiency can be increased and/or the manageability is improved and/or the fabrication costs can be reduced and/or the manufacturing time or the manufacturing effort is reduced and/or the lifetime of the injection arrangement is increased.

This objective is achieved by the present invention with the injection arrangement for a moulding machine as described below, a moulding machine with such an injection arrangement, and a method for operating an injection arrangement as described below.

According to the invention, a connecting device is coupled to the discharge opening of the moulding compound reservoir and the injection unit and is configured to direct the plasticized mass from the moulding compound reservoir to the injection unit, and the connecting device comprises at least one articulated element. With the at least one articulated element, a relative movement between the moulding compound reservoir and the injection unit can be performed.

With the at least one articulated element, the injection unit is decoupled from the moulding compound reservoir—at least in a certain area, wherein relative movements between these two elements are enabled.

Thus, for example, the injection unit can be mounted in a linearly displaceable manner in order to be able to perform an injection movement or a pressing-on movement to a moulding tool, whereas for the moulding compound reservoir, there is the possibility to be mounted in a stationary manner.

With the possibility of mounting the moulding compound reservoir in a stationary manner or the possibility of performing a relative movement with the moulding compound reservoir relative to the injection unit, the required installation space can be substantially reduced, since it must no longer be provided to plan for installation space, which had been required by the synchronous movement of the moulding compound reservoir and the injection unit.

The fabrication costs, too, can be substantially reduced, since it must no longer be provided that the moulding compound reservoir is arranged in a displaceable manner with bearings or bearing rails on a machine bed. Separate drive units for the moulding compound reservoir, in order to move the same, too, are no longer required. Drive units of the injection units (which, for example, previously carried along the moulding compound reservoir) can be dimensioned smaller, since the moved mass is substantially reduced.

The lifetime, too, can be increased, since, with the reduced moved masses, and thus the no longer required bearings, maintenance work is reduced and/or wear parts simply no longer exist.

Moulding machines can mean injection moulding machines, injection presses, presses, and the like.

Moulding tools can comprise a cavity or several mould cavities, into which a plasticized mass is introduced. Applications of the invention for moulding machines, in which the plasticized mass is fed to an open tool, however, are quite conceivable, too.

The articulated element according to the invention can comprise a swivel joint and/or a sliding joint.

The moulding compound reservoir is configured as at least one plasticizing unit, which preferably comprises at least one plasticizing screw and/or at least one extruder screw.

Extruder screws are rotationally driven for plasticizing. According to the present, used terminology, plasticizing screws additionally comprise a drive for screw advancement, using which plasticized mass can be pushed out from an injection cylinder. Accordingly, plasticizing screws can also serve as (part of) an injection unit.

Materials fed into a plasticizing unit can include, for example, plastics, fibre materials, additives, fillers, blowing agent for foamed plastics, "wood" compounds, or the like, wherein the plasticized mass is formed from these materials.

Preferably, the injection unit comprises at least one plasticizing screw and/or one injection piston and/or one injection cylinder, and the plasticizing screw or the injection piston can preferably be arranged in the injection cylinder.

Injection cylinders can, for example, comprise an injection piston, which is arranged in the injection cylinder, and can force out a plasticized mass from the same by an axial movement, wherein the forced out plasticized mass is fed to a moulding tool via an injection nozzle, for example.

Injection cylinders are frequently also referred to as "shooting pots" or "shot pots".

The injection unit is mounted in a manner linearly displaceable along a longitudinal axis.

Preferably, the injection unit comprises a drive mechanism—preferably formed by at least one piston-cylinder unit and/or at least one spindle drive.

In that, the injection unit is connected with a rack, preferably a rack of the moulding machine, via linear guide elements.

The moulding compound reservoir can be mounted in a stationary manner.

Preferably, the connecting device can connect the discharge opening of the moulding compound reservoir and the injection unit shielded from the environment—preferably in an airtight manner.

With the shielding by the connecting device, the plasticized mass is protected from entering a reaction due to environmental conditions. Thus, for example, a reaction of the plasticized mass with the ambient air or, for example, due to UV radiation reaching the plasticized mass, can be prevented by shielding.

The connecting device can also be flooded with an inert gas, which prevents a reaction of the plasticized mass with air, for example.

The connecting device, at least some sections of it, can be configured in a tubular manner.

Preferably, the moulding compound reservoir and/or the connecting device comprise a degassing device.

Degassing devices can be provided in order to remove undesired gases from the plasticized mass, which occur upon plasticizing certain materials. In particular, such gases can occur, for example, with recycling applications and/or upon plasticizing materials, which had already been used before.

Preferably, the connecting device is configured with a variable length. This can be implemented, for example, by a telescoping section of the connecting device.

The connecting device can compensate for differences in length due to small relative movements of the injection unit relative to the at least one moulding compound reservoir with an elastic deformation. If, however, these relative movements become larger, it may be required to implement a section with a variable length in the connecting device.

The connecting device can comprise two articulated elements.

Preferably, the at least one articulated element is configured as a ball joint.

The at least one articulated element can also be configured as a flexure bearing.

The connecting device can be configured in such a way that the plasticized mass from the moulding compound reservoir falls into the injection unit by the force of gravity—preferably contact-free with the connecting device. Thus, the connecting device can surround the falling plasticized mass in a contact-free manner (for example in a tubular manner).

Preferably, the moulding compound reservoir comprises a recycling device.

A recycling device can be a plasticizing unit, which is configured to process recycled plastics. Or more precisely, it means that plastics are recycled by a plasticizing unit. In that, preferably plastics which had already been used before, are plasticized and supplied as a raw material for processing into a moulding part again.

A recycling device can include devices for shredding and degassing plastics to be recycled.

BRIEF DESCRIPTION OF THE DRAWINGS

Further details and embodiments of the invention are apparent from the figures as well as the associated description of the figures. In that:

FIG. 1 illustrates a first embodiment of an injection arrangement according to the invention, FIG. 2 illustrates a first embodiment of an articulated element, FIG. 3 illustrates a second embodiment of an articulated element, FIG. 6 illustrates a third embodiment of an articulated element, FIG. 9 illustrates a sixth embodiment of an articulated element.

DETAILED DESCRIPTION OF THE INVENTION

Figure 5:
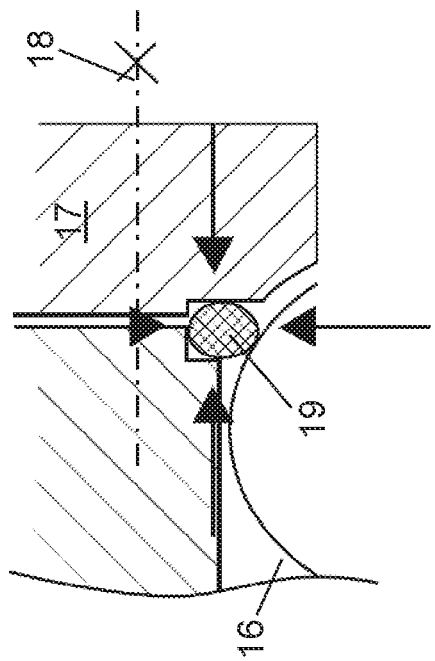
FIG. 5 is a detailed view for FIG. 2, 3, or 4.

FIG. 1 illustrates a first embodiment of an injection arrangement 1 according to the invention. The injection arrangement comprises a moulding compound reservoir 2 and an injection unit 3.

The moulding compound reservoir 2 is formed by an extruder screw 8, which is driven via the rotational drive 12.

The extruder screw 8 extrudes a material, which is fed into it via the filling funnel 13, and continuously pushes out the plasticized mass via the discharge opening 4. Via the connecting device 5, the plasticized mass reaches the feed opening 15 of the injection unit 3.

In this embodiment, the injection unit 3 is shown by the plasticizing screw 7, which further plasticizes the plasticized mass fed from the moulding compound reservoir 2 and injects it into a moulding tool via an injection nozzle 10.

The plasticizing screw 7 can be rotationally driven via a rotational drive 11 and can be displaced along the longitudinal axis 9 of the injection unit 3 by a linear drive, which is not illustrated in this figure for reasons of clarity.

A linear drive of a plasticizing screw 7 can, for example, be executed as a piston-cylinder unit or a spindle drive.

As schematically indicated in this figure, the moulding compound reservoir 2 is mounted in a static (fixed) manner (represented by the fixed bearings) and the injection unit 3 is mounted in a linearly displaceable manner (represented by the floating bearings).

The connecting device 5, here represented in a tube-like manner, comprises two articulated elements 6, which enable the injection unit 3 to move relative to the moulding compound reservoir 2.

With very small, linear relative movements between the injection unit 3 and the moulding compound reservoir 2, the required variation in length of the connecting device 5 can be managed with an elastic deformation of the same.

If the relative movement becomes larger, it may be required to compensate for the variation in length between the two articulated elements 6—for example, by a telescoping section—so that no damages damage of the connecting device 5 occurs.

Furthermore, a filter unit 14 is provided in the connecting device 5, which can remove larger particles from the plasticized mass coming from the moulding compound reservoir 2.

The connecting device 5 can comprise a degassing device or can be connected to such a device, wherein undesired gases can be sucked off from the plasticized mass.

Preferably, the connecting device 5 is arranged in such a way that the plasticized mass from the moulding compound reservoir 2 falls into the injection unit 3 by the force of gravity, and the connecting device 5 surrounds the falling plasticized mass in a contact-free manner.

This can be achieved, for example, with a connecting device 5 configured in a perpendicular tubular manner.

FIG. 2 illustrates a first embodiment of an articulated element 6 for a connecting device 5 of an injection arrangement 1 according to the invention.

The connecting device 5 of this embodiment is formed by a tube, more precisely, by a divided tube, which comprises a first part 16 of the connecting device 5 and a second part 17 of the connecting device 5.

The first part 16 and the second part 17 are connected with one another via the articulated element 6, wherein the endpiece of the first part 16 is configured with a spherical section 20.

The second part 17 rests against the spherically formed end of the first part 16, more precisely, its outer surface, via the gasket 19 or it is braced therewith via bolts 18.

The bolts 18 of this embodiment can be formed, for example, by standard-conforming bolts. By screwing in these bolts 18, the second part 17 is braced with the first part 16, wherein the gasket 19 between the first part 16 and the second part 17 is braced/pressed-on and seals off the interior of the tubes (in other words, shields it from the environment).

With a relative movement of the first part 16 to the second part 17, the gasket 19 at the spherical section 20 is displaced, and a relative movement of the tubes to one another is permitted without damaging.

FIG. 3 illustrates a second embodiment of an articulated element 6, wherein the functionality of the embodiment of FIG. 3 corresponds to that of FIG. 2.

However, in FIG. 3, in contrast to FIG. 2, the bolt 18 executed as a piston rod element of a hydraulic device, wherein the parts 16, 17 can be braced with one another and released from one another in a hydraulic manner.

This results in the substantial advantage, that the bracing can be released upon a movement of part 16 relative to part 17, in order to permit the movement with a lower resistance (caused by friction) to avoid increased wear of the gasket.

Thus, for example, it can be provided that prior to a relative movement of the injection unit 3 to the moulding compound reservoir 2 the braced parts 16, 17 are released, and once the movement has been performed, the tensioning of the first part 16 with the second part 17 using the bolt 18 is re-established via the hydraulic element.

Figure 4:
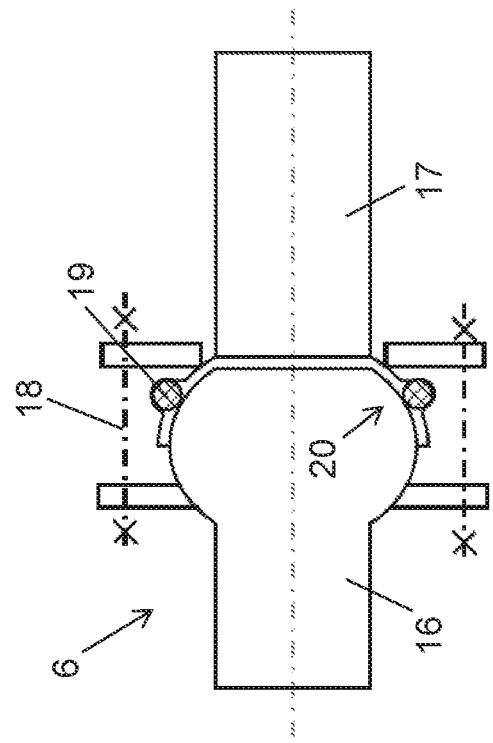
FIG. 4 illustrates a schematic representation of a ball joint.

FIG. 4 illustrates a schematic representation of the already explained embodiments of FIG. 2 or 3, wherein it is indicated that, via a bolt connection, a first part 16 can be braced with a second part 17 of the connecting device 5, wherein, via a spherical section 20, a movement of the parts 16, 17 relative to one another is permitted. Such a joint structure is also being referred to as a ball joint.

FIG. 5 illustrates a detailed view for FIG. 2, 3, or 4, wherein the detail of the gasket 19 is represented enlarged.

It is very easy to recognize, how, due to the tensioning of the first part 16 with the second part 17 with the bolt 18, a force acts on the gasket from four opposite directions, wherein an approximately hydrostatic load of the gasket can occur, resulting in particularly favorable sealing conditions and wear conditions.

FIG. 6 illustrates a third embodiment of an articulated element 6 of a connecting device 5, wherein in the embodiment of FIG. 6, the articulated element 6 is directly coupled to the injection unit 3. The injection unit 3 can be recognized as the cylinder of a plasticizing screw 7.

In this embodiment, the connecting device 5 comprises a tube-like connection, which, via the guide element 21, is guided in a retaining element 22 fastened to the injection unit 3.

The feed opening 15 of the injection unit 3 is shaped as an oblong hole, to which the connecting device 5, configured in a tubular manner, is guided via the retaining element 22 and the guide element 21.

The guide element 21 is bolted to the injection unit 3.

The linear freedom of movement of the connecting device 5 along the injection unit 3 is indicated by the arrow.

Figure 7:
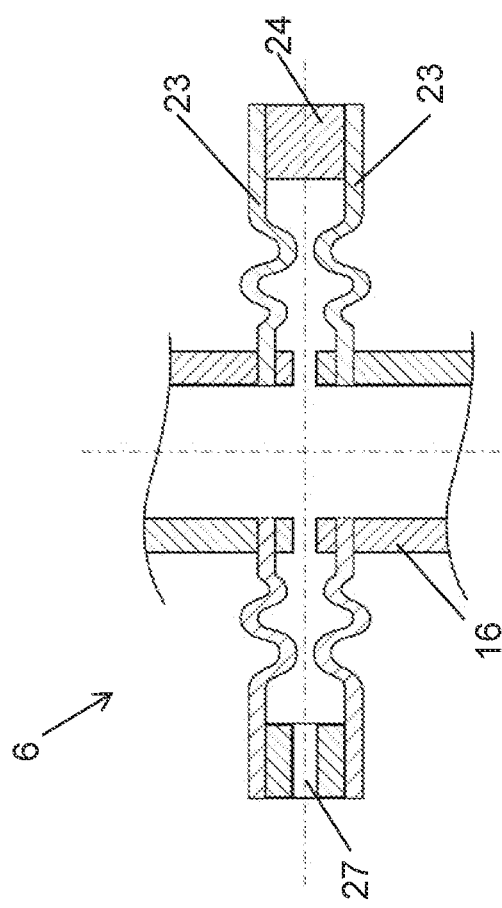
FIG. 7 illustrates a further embodiment of an articulated element.

FIG. 7 illustrates a further embodiment of an articulated element 6 of a connecting device 5 for an injection arrangement 1, wherein a first part 16 and a second part 17, which both are formed by tubes, are connected with one another via a flexure bearing.

The flexure bearing is formed by the two elastic washers 23, which are connected with one another via the connecting disc 24.

The two elastic washers 23 can permit an increased elastic deformation due to their shape, which can be additionally supported by a suitable choice of material. A suitable material for an increased elastic deformability would be rubber, for example.

With the rotationally symmetric design of this flexure bearing, which is shown by FIG. 7, a tilting or relative movement of the first part 16 to the second part 17 in all spatial directions is possible, too.

Furthermore, with the elastic washers 23, a relative movement of the first part 16 to the second part 17—even though only small—linearly along the axis of symmetry of the parts 16 and 17 is admissible, too.

The opening 27 shown on the left-hand side of this embodiment can be used to connect a degassing device to the connecting device 5, wherein undesired gases can be sucked off from the connecting device 5 via the opening 27. Such a degassing device can be configured as a vacuum suction device, for example.

Figure 8:
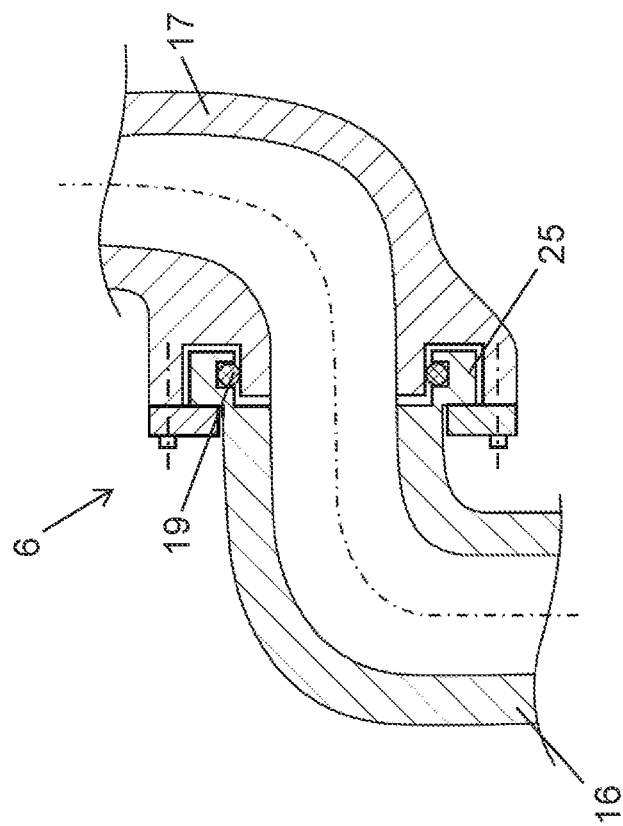
FIG. 8 illustrates a fifth embodiment of an articulated element.

FIG. 8 illustrates a fifth embodiment of an articulated element 6 of a connecting device 5 for an injection arrangement 1.

In this embodiment, the two tube elements (the first part 16 and the second part 17 of the connecting device 5) are connected with one another via the flange 25. More precisely, they are bolted to one another, wherein the interior of the tubes is shielded from the environment with the gasket 19.

With the flange 25, a rotation around the center axis is permitted, wherein the first part 16 and the second part 17 can rotate relative to one another.

FIG. 9 illustrates a sixth embodiment of an articulated element 6 for a connecting device 5 of an injection arrangement 1.

Here, a first tubular part 16 of the connecting device 5 is connected with a second part 17 of the connecting device 5 via a flange 25 by a clamping element 26.

The flange 25 is arranged at the first part 16. A clamping device 26, which is arranged at the second part 17, can be inserted into the flange 25 via a hook and can be braced via an actuation lever.

LIST OF REFERENCE SIGNS

1 Injection arrangement
2 Moulding compound reservoir
3 Injection unit
4 Discharge opening
5 Connecting device
6 Articulated element
7 Plasticizing screw
8 Extruder screw
9 Longitudinal axis of the injection unit
10 Injection nozzle
11 Rotational drive of the injection unit
12 Rotational drive of the moulding compound reservoir
13 Filling funnel
14 Filter unit
15 Feed opening of the injection unit
16 First part of the connecting device
17 Second part of the connecting device
18 Bolt
19 Gasket
20 Spherical section
21 Guide element
22 Retaining element
23 Washer
24 Connecting disc
25 Flange
26 Clamping element
27 Opening

The invention claimed is:

1. An injection arrangement for a moulding machine, the injection arrangement comprising:
a moulding compound reservoir configured to produce a plasticized mass and to push out the plasticized mass through a discharge opening;
an injection unit comprising a plasticizing screw and/or an injection piston; and
a connecting device coupled to the discharge opening of the moulding compound reservoir and a feed opening of the injection unit, and configured to direct the plasticized mass from the moulding compound reservoir to the injection unit,
wherein the connecting device comprises an articulated element configured to allow a relative movement between the moulding compound reservoir and the injection unit, and
wherein the connecting device includes a degassing device.

2. The injection arrangement according to claim 1, wherein the moulding compound reservoir is configured as a plasticizing unit.

3. The injection arrangement according to claim 1, wherein the injection unit further comprises an injection cylinder.

4. The injection arrangement according to claim 1, wherein the injection unit is mounted to be linearly displaceable along a longitudinal axis.

5. The injection arrangement according to claim 1, wherein the injection unit comprises a drive mechanism.

6. The injection arrangement according to claim 1, wherein the moulding compound reservoir is mounted in a stationary manner.

7. The injection arrangement according to claim 1, wherein the connecting device connects the discharge opening of the moulding compound reservoir to the injection unit so as to be shielded from an environment.

8. The injection arrangement according to claim 1, wherein at least a section of the connecting device is configured in a tubular manner.

9. The injection arrangement according to claim 1, wherein the moulding compound reservoir comprises a degassing device.

10. The injection arrangement according to claim 1, wherein the connecting device has a variable length.

11. The injection arrangement according to claim 10, wherein the connecting device comprises a telescoping section.

12. The injection arrangement according to claim 1, wherein the articulated element of the connecting device is a first articulated element, the connecting device further comprising a second articulated element.

13. The injection arrangement according to claim 1, wherein the articulated element is a ball joint.

14. The injection arrangement according to claim 1, wherein the articulated element is a flexure bearing.

15. The injection arrangement according to claim 1, wherein the moulding compound reservoir comprises a recycling device.

16. A moulding machine comprising the injection arrangement according to claim 1.

17. A method for operating the injection arrangement according to claim 1, the method comprising:

generating a plasticized mass using the moulding compound reservoir by pushing out the plasticized mass through the discharge opening, transferring the plasticized mass from the moulding compound reservoir to the injection unit using the connecting device, compensating for a relative movement between the moulding compound reservoir and the injection unit via the articulated element of the connecting device, and degassing the plasticized mass transferred through the connecting device using the degassing device of the connecting device.

18. The injection arrangement according to claim 2, wherein the plasticizing unit comprises a plasticizing screw and/or an extruder screw.

19. The injection arrangement according to claim 5, wherein the drive mechanism comprises a piston-cylinder unit and/or a spindle drive.

20. The injection arrangement according to claim 7, wherein the connecting device connects the discharge opening of the moulding compound reservoir to the injection unit in an airtight manner.

\* \* \* \* \*